INVENTORS
CHARLES L. LEFFLER, JR.
THOMAS R. CURRAN
BY
Brown, Critchlow, Flick & Peckham
ATTORNEYS.

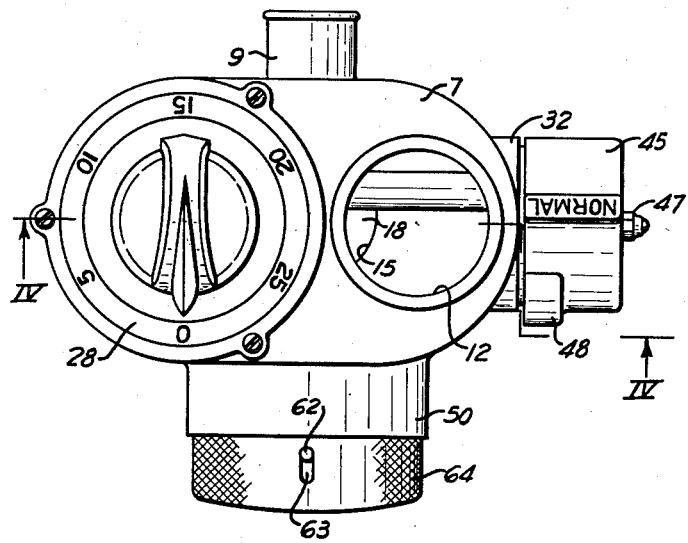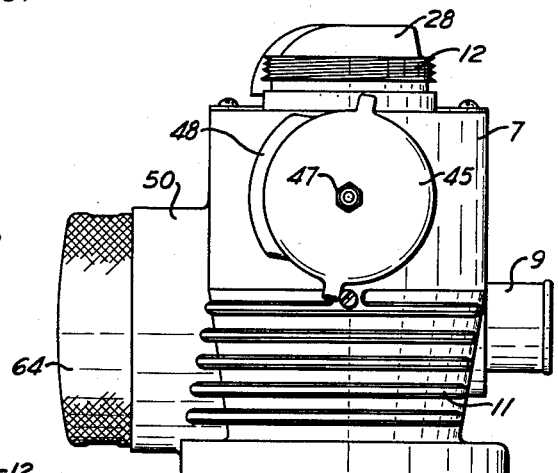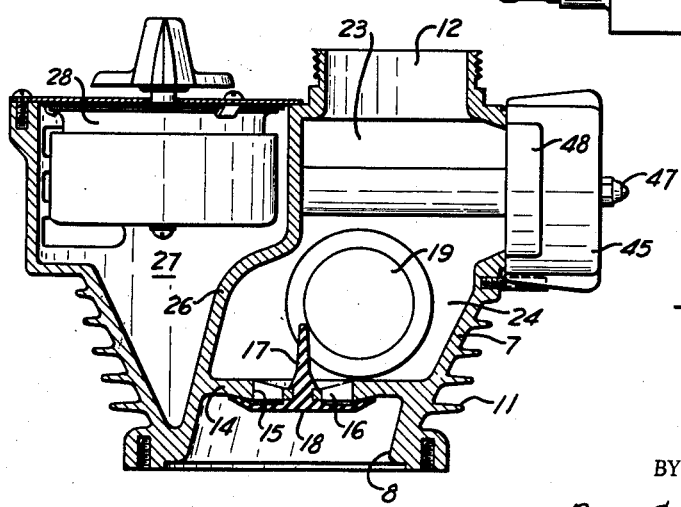

June 29, 1965 C. L. LEFFLER, JR., ETAL 3,191,598
RESPIRATOR VALVE MECHANISM
Filed June 26, 1962 3 Sheets-Sheet 3

INVENTORS
CHARLES L. LEFFLER, JR.
THOMAS R. CURRAN
BY
Brown, Critchlow, Flick & Peckham.
ATTORNEYS.

3,191,598
RESPIRATOR VALVE MECHANISM
Charles L. Leffler, Jr., Westminster, Calif., and Thomas R. Curran, Monroeville, Pa., assignors to Mine Safety Appliances Company, Pittsburgh, Pa., a corporation of Pennsylvania
Filed June 26, 1962, Ser. No. 205,263
4 Claims. (Cl. 128—142)

This invention relates to respirators, and more particularly to a valve mechanism connected with a breathing bag and an air purifying and oxygen generating canister.

It is among the objects of this invention to provide a respirator with a valve mechanism which is carried by the same support that carries the canister and breathing bag, which is compact, which regulates the pressure in the system, and which permits quick starting.

In accordance with this invention a breathing bag and an air purifying and oxygen generating canister are carried by a support that also carries a valve mechanism. The outlet of the canister is connected with the inlet of the bag. The valve mechanism has a housing provided with an outlet communicating with the canister inlet and having an inlet communicating with the outlet of the bag. The housing also has a combination inlet and outlet opening adapted to be connected to one end of a breathing hose. There are check valves in the housing controlling flow between that opening and the housing inlet and outlet. The housing may contain a partition wall that separates its inlet from its outlet and the combination opening, whereby to form two chambers. The wall is provided with an inlet port, normally closed by a check valve. The chamber containing the outlet valve has a pressure relief port normally closed by a relief valve. Operatively connected to this last valve is a flexible diaphragm that is actuated by the gas pressure in the other chamber when that pressure rises above a predetermined maximum. The housing may also be provided with an auxiliary inlet port normally closed by a valve that can be moved inwardly to open it. Manually operable means mounted on the housing presses an oxygen candle against the valve when desired in order to open the valve. Means also is provided for igniting the candle to supply oxygen to the inside of the housing through the auxiliary inlet port.

The preferred embodiment of the invention is illustrated in the accompanying drawings, in which FIG. 1 is a front view of breathing apparatus that includes our valve mechanism;

FIG. 2 is an enlarged plan view of the valve mechanism alone;

FIG. 3 is a side view thereof;

FIG. 4 is a vertical section taken on the line IV—IV of FIG. 2;

Figure 1:
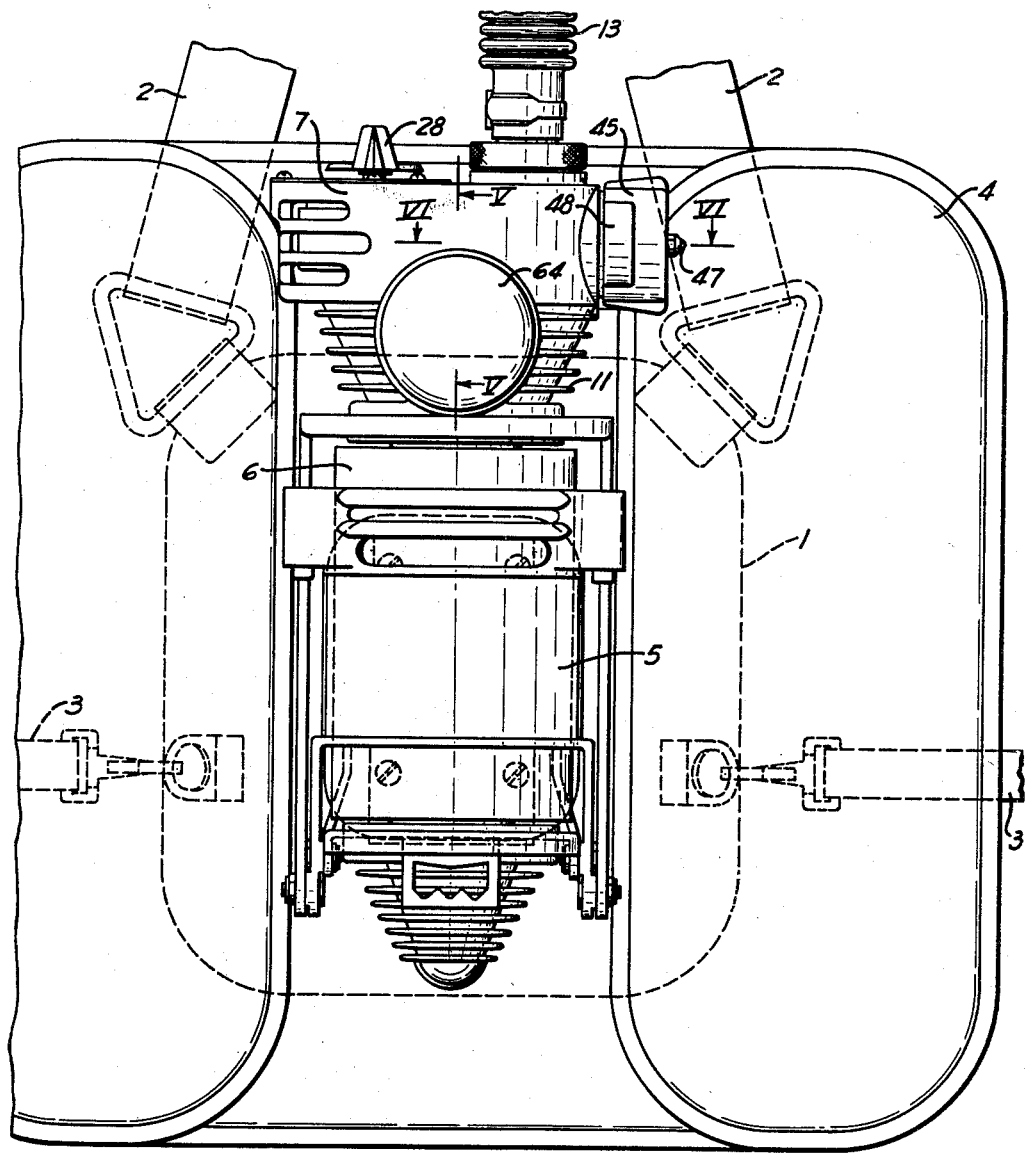

Referring to FIG. 1 of the drawings, a chest plate 1 is provided with straps 2 and 3 for strapping it over a man's chest. The plate forms a support for a double breathing bag 4 and for a holder 5 for an air purifying and oxygen generating canister 6 of well-known construction. The construction and operation of the holder are described in our copending application, Serial Number 200,280, filed June 5, 1962, now Patent Number 3,111,-947. The canister has an inlet at its top and an outlet at its bottom. The outlet is connected by a passage through the base of the canister holder with the lower part of the bag. Clamped against the top of the canister is a valve mechanism that includes a housing 7 provided in its bottom with an outlet 8 (FIG. 4) that opens into the upper end of the canister. The back of the housing has an inlet 9 that is connected by a flexible conduit 10 (FIG. 5) with the upper part of the breathing bag. The mechanism therefore forms a permanent part of the breathing bag-canister holder combination, all carried by the supporting chest plate. The lower part of the valve housing is partly encircled by vertically spaced integral fins 11 for rapid dissipation of heat.

Figure 5:
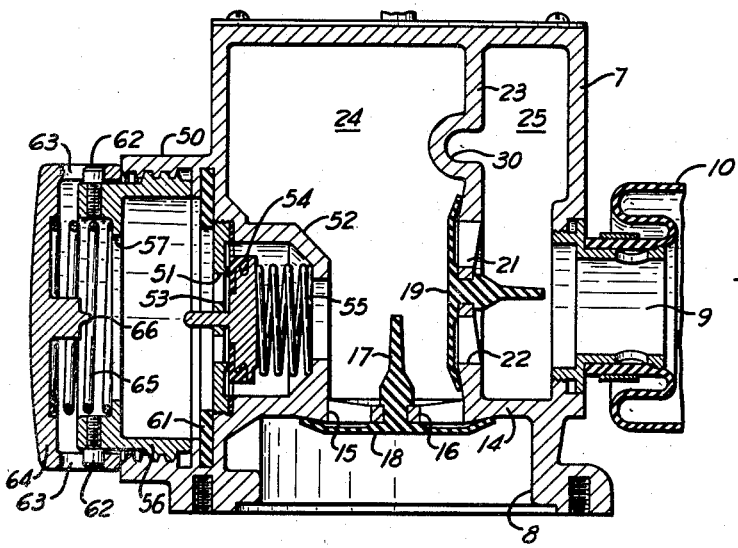
FIG. 5 is an enlarged vertical section taken on the line V—V of FIG. 1.

The top of the valve housing is provided with a combination inlet and outlet opening 12 (FIGS. 2 and 4) that is connected to the lower end of a breathing hose 13 (FIG. 1), the upper end of which is connected to a facepiece (not shown). As shown in FIGS. 4 and 5, the bottom outlet 8 of the housing is controlled by a check valve, preferably by providing the inside of the housing with a horizontal wall 14 a short distance above its bottom. This wall has an outlet port 15, in which there is an integral spider 16 provided with a central vertical opening, up through which extends the central stem 17 of a circular flexible valve 18 that normally engages the wall around the port to prevent upward flow through it. The inlet 9 of the housing also is controlled by a check valve 19 so that when the user exhales, the air cannot enter the breathing bag until it has passed down through the canister and been purified and combined with oxygen generated by the chemical in the canister. The inlet check valve is spaced from the housing inlet 9 and is mounted in a spider 21 in an inlet port 22 formed in a vertical partition 23 that divides the main part of the housing into two chambers 24 and 25 separated by a cross partition 26 from a third chamber 27 that is completely closed. A bell-ringing timer 28 can be mounted in chamber 27 to indicate how much life remains in the canister.

The main chamber 24 contains outlet port 15 and the combination inlet and outlet opening 12. Chamber 25 is smaller than chamber 24. When the user inhales through hose 13, he tends to reduce the pressure in chamber 24 and this causes check valve 18 to tightly close outlet port 15. At the same time, check valve 19 opens and permits air to enter chamber 24 through inlet port 22 from chamber 25, which has its inlet 9 connected with the breathing bag and canister 6. When the user exhales through hose 13, the pressure in chamber 24 is increased to close valve 19 and open valve 18 so that the exhaled air can pass through housing outlet 8 and into the canister where it is purified and oxygen is added to it. The mixture then flows from the canister into the breathing bag and back to chamber 25 of the valve housing.

Figure 6:
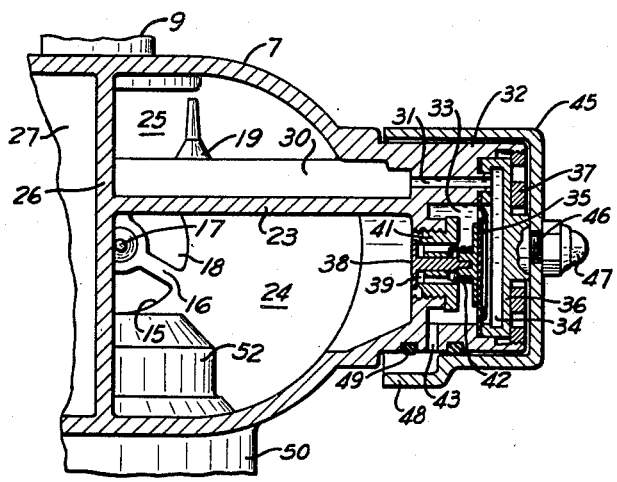
FIG. 6 is an enlarged fragmentary vertical section taken on the line VI—VI of FIG. 1.

Since it is possible that more oxygen will be generated in the canister than might be consumed by the user, which would increase the gas pressure in the entire system, provision is made for periodically dumping some of the gas from the system to keep the pressure down. Accordingly, chamber 25 preferably includes a horizontal channel 30 that extends across it and is formed by offsetting a portion of partition 23. At the outer end of this channel the side wall of the housing is provided with a small passage 31, as shown in FIG. 6, the outer end of which opens into the outer end of a diaphragm chamber formed in a lateral extension 32 of the housing. This chamber is separated into inner and outer sections 33 and 34 by means of a flexible diaphragm 35 that is clamped against a radial shoulder by means of a flanged clamping plate 36 that is held in place by a nut 37 screwed into the outer end of extension 32. The center of the diaphragm engages the outer end of the stem of a relief valve 38 that closes a relief port 39 in the side wall of the housing at the inner end of the diaphragm chamber. The valve stem slides in the central opening of a spider 41 in the relief port passage, and the diaphragm is urged away from the spider by a coil spring 42 between them. The side wall of the inner section of the diaphragm chamber has a radial outlet port 43 that connects it with the atmosphere. When the gas pressure in chamber 25 starts to exceed a predetermined value, the pressure in the outer section 34 of the diaphragm chamber increases accordingly and moves the diaphragm inwardly to open the relief port. This allows some of the pressure in the main chamber 24 to escape from the valve housing and thereby prevents that pressure from becoming excessive. It will be observed that it is the expired air that is released in this manner, and not the revivified air nor the oxygen that was added to it by the canister. Accordingly, overproduction of oxygen by the canister is avoided at a time when there already is an excessive amount.

The housing extension 32 may be encircled by a cup-like knob 45 that is rotatably mounted on a threaded stud 46 projecting through it from the center of nut 37. The knob is held in place by means of a nut 47 on the stud. Although the knob overlaps outlet port 43, it does not obstruct the port during use of the breathing apparatus because the knob has an outwardly offset portion 48 that spaces it from the port. However, the knob can be turned far enough to move the offset part away from port 43, whereupon the side wall of the knob in engagement with a sealing ring 49 around the outer end of the port will shut off the outlet. That is done when it is desired to build up a high pressure in the breathing apparatus to test for leaks.

Since under certain conditions it may require more time than is available for the oxygen canister to start producing oxygen, provision is made for quickly generating oxygen until the canister can get into operation. The use of this quick start feature is optional. To provide for it, the front of the valve housing is provided with a forwardly projecting circular flange 50 as shown in FIG. 5, and the front wall of the housing inside the flange is provided with an auxiliary inlet port 51 that may be encircled by an inwardly projecting cage 52. This inlet port contains a spider 53 having a central opening in which the stem of a valve 54 is slidingly mounted. The valve normally is pressed outwardly against its seat by a coil spring 55 compressed between the valve and the inner end of the cage. A cup 56 is screwed into flange 50 and has a projecting outer end portion provided with a central opening 57.

Figure 7:
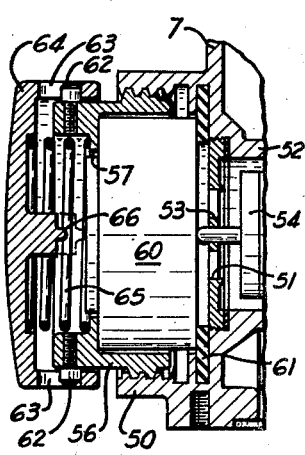
FIG. 7 is a detail of FIG. 5, but showing an oxygen candle in place.

When it is desired to use the quick starting feature, an oxygen candle 60 of well-known construction (FIG. 7) is placed inside cup 56 after it has been removed from flange 50, and then the cup is screwed back into the flange until the inner end of the candle seats against a gasket 61 around auxiliary inlet port 51. This will cause the candle to push against the stem of valve 54 and open the port. To ignite the candle, the projecting portion of the cup is provided with two or more radial studs 62 that project out into parallel slots 63 in the encircling skirt of a cap 64 slidingly mounted on the cup. The cap is urged away from the cup by a coil spring 65 compressed between them. The inside of the cap is provided with a central firing pin 66 that can strike a percussion ignition cap on the candle when the cap is struck by the hand to drive it toward housing 7. This will ignite the candle and oxygen will immediately flow into valve housing chamber 24 and be available for inhaling.

In accordance with the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. The combination with a support carrying an air purifying and oxygen generating canister having an inlet and an outlet, and a breathing bag communicating with said outlet and having an outlet, of a valve mechanism carried by said support and comprising a housing having an outlet communicating with said canister inlet and having an inlet communicating with said bag outlet, the housing also having a combination inlet and outlet opening adapted to be connected to one end of a breathing hose, a check valve for said housing outlet, a partition in the housing separating its inlet from its outlet and said opening and forming two chambers, said partition being provided with an inlet port, a check valve for said port, said housing being provided with a diaphragm chamber having a wall separating that chamber from the chamber containing said outlet valve, said wall having a relief port therein, a valve normally closing said relief port, a flexible diaphragm in said diaphragm chamber dividing it into inner and outer sections, said inner section having an outlet port, said housing being provided with a passage connecting the other of said two chambers with said outer section of the diaphragm chamber, and means operatively connecting the diaphragm with said relief valve for opening said relief port when the fluid pressure in said other chamber exceeds a predetermined value.

2. The combination recited in claim 1, including manually operative means for closing said outlet port to render said relief port ineffective.

3. The combination with a support carrying an air purifying and oxygen generating canister having an inlet and an outlet and a breathing bag communicating with said outlet and having an outlet, of a valve mechanism carried by said support and comprising a housing having an outlet communicating with said canister inlet and having an inlet communicating with said bag outlet, the housing also having a combination inlet and outlet opening adapted to be connected to one end of a breathing hose, check valves in the housing controlling flow between said opening and said housing inlet and outlet, the housing being provided with an auxiliary inlet port, a valve normally closing said port but movable inwardly away from it, a cylindrical flange projecting from the housing around the outer end of said inlet port for receiving a percussion ignitable oxygen candle, a cup in screw threaded engagement with said flange for pressing the candle against said last-mentioned valve to open it, said cup projecting from the flange and having an outer end wall provided with an opening to expose a portion of the candle, and a cap slidably mounted on the projecting portion of the cup for movement toward said flange, the inside of the cap being provided with a firing pin in line with said cup opening for striking the candle to ignite it when the cap is pushed sharply inward.

4. The combination recited in claim 3, in which said cap encircles the projecting portion of the cup and is provided around the cup with circumferentially spaced slots parallel to its axis, and radial studs project from the cup into said slots to slidingly connect the cap to the cup.

References Cited by the Examiner

UNITED STATES PATENTS

| 2,220,673 | 11/40 | Bloomheart | 137—63 |
| 2,269,500 | 1/42 | Wildhack | 128—191 |
| 2,324,716 | 7/43 | Nohl | 128—191 |
| 2,325,049 | 7/43 | Frye et al. | 128—191 |
| 2,617,414 | 11/52 | Hollmann | 137—64 X |
| 2,695,022 | 11/54 | Hamilton et al. | 128—202 X |
| 2,710,003 | 6/55 | Hamilton et al. | 128—191 |
| 2,852,023 | 9/58 | Hamilton et al. | 128—203 |

FOREIGN PATENTS

| 488,632 | 10/36 | Great Britain. |
| 229,530 | 2/44 | Switzerland. |

RICHARD A. GAUDET, *Primary Examiner.*

JORDAN FRANKLIN, *Examiner.*